US012775802B2

(12) United States Patent
Krabach et al.

(10) Patent No.: US 12,775,802 B2
(45) Date of Patent: Oct. 27, 2026

(54) ORCHESTRATOR WITH SEMANTIC-BASED REQUEST ROUTING FOR USE IN RESPONSE GENERATION USING A TRAINED GENERATIVE LANGUAGE MODEL

(71) Applicant: Microsoft Technology Licensing, LLC, Redmond, WA (US)

(72) Inventors: Brian Scott Krabach, Snohomish, WA (US); Samuel Edward Schillace, Portola Valley, CA (US); Umesh Madan, Bellevue, WA (US); Paul Robert Payne, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 18/514,856

(22) Filed: Nov. 20, 2023

(65) Prior Publication Data

US 2025/0165714 A1 May 22, 2025

(51) Int. Cl.

*G06F 40/30* (2020.01)
*G06F 9/48* (2006.01)
*G06F 40/40* (2020.01)

(52) U.S. Cl.

CPC ............ *G06F 40/30* (2020.01); *G06F 9/4843* (2013.01); *G06F 40/40* (2020.01)

(58) Field of Classification Search

CPC ........ G06F 40/30; G06F 9/4843; G06F 40/40; G06F 16/33295; G06F 40/56; G06F 40/35

See application file for complete search history.

(56) References Cited

U.S. PATENT DOCUMENTS 9,172,747 B2 10/2015 Walters
2014/0244712 A1* 8/2014 Walters .................. H04L 67/10 709/202
2018/0293484 A1 10/2018 Wang (Continued)

OTHER PUBLICATIONS

Händler, T. (2023, October). A Taxonomy for Autonomous LLM-Powered Multi-Agent Architectures. In KMIS (pp. 85-98). (Year: 2023).*

(Continued)

*Primary Examiner* — Philip H Lam
(74) *Attorney, Agent, or Firm* — Alleman Hall LLP

(57) ABSTRACT

A system is provided for managing specialized tasks and information retrieval processes. Agents are configured to perform tasks and/or retrieve information in a specialized domain. The system receives, via an interaction interface, a message from a user for the trained generative model to generate an output, generates a context of the message, generates a request including the context and the message, executes an orchestrator configured to: receive the request, determine, using semantic decision making, one or more agents to handle the request, input the request into one or more agents to perform a task and/or retrieve information in specialized domains, generate a prompt based on the retrieved information and/or the performed task and the message from the user, provide the prompt to the trained generative model, receive, in response to the prompt, a response from the trained generative model, and output the response to the user.

20 Claims, 12 Drawing Sheets

(56) References Cited

U.S. PATENT DOCUMENTS

| | | | | |
|---|---|---|---|---|
| 2023/0131495 | A1* | 4/2023 | Tater | G06F 40/30<br>706/45 |
| 2024/0185834 | A1* | 6/2024 | Aharoni | G10L 15/22 |
| 2024/0202225 | A1* | 6/2024 | Siebel | G06N 20/00 |
| 2024/0403112 | A1* | 12/2024 | Mohammed | G06Q 10/06311 |
| 2025/0053793 | A1* | 2/2025 | Liu | G06N 3/092 |
| 2025/0148258 | A1* | 5/2025 | Jones | G06N 3/006 |

OTHER PUBLICATIONS

Händler, T. (2023). Balancing autonomy and alignment: A multi-dimensional taxonomy for autonomous LLM-powered multi-agent architectures. arXiv preprint arXiv:2310.03659. (Year: 2023).*

Ge, Y., Ren, Y., Hua, W., Xu, S., Tan, J., & Zhang, Y. (2023). LIm as os, agents as apps: Envisioning aios, agents and the aios-agent ecosystem. arXiv preprint arXiv:2312.03815.0 (Year: 2023).*

International Search Report and Written Opinion received for PCT Application No. PCT/US2024/053479, Feb. 13, 2025, 13 pages.

* cited by examiner

ORCHESTRATOR WITH SEMANTIC-BASED REQUEST ROUTING FOR USE IN RESPONSE GENERATION USING A TRAINED GENERATIVE LANGUAGE MODEL

BACKGROUND

The advent of generative models, especially large language models, has significantly advanced human-computer interactions. These models are trained on extensive data sets that enable them to generate text which can be coherent, contextually relevant, and insightful. Users often interact with these generative models through various platforms, inputting inquiries, asking questions, or seeking advice on a wide range of topics. Such interactions can span simple queries like asking for the weather forecast to complex discussions about philosophy, technology, and beyond.

However, a key challenge that persists in the realm of generative models and natural language processing technologies is the limitation in handling specialized tasks or retrieving specialized information. While large language models excel at producing text that is coherent and contextually relevant, they often struggle to perform tasks that require domain-specific expertise or actions. For example, ordering a pizza or managing a flight reservation involves a series of steps that need to be accurately and efficiently executed. These steps may include selecting specific items from a menu, specifying preferences, confirming availability, and completing payment processes. Similarly, retrieving specialized information in areas such as law, medicine, or engineering often necessitates a depth of knowledge and understanding that general-purpose generative models may lack.

Currently, users looking to perform such specialized tasks often have to switch between multiple platforms, applications, or services, each designed to handle a specific type of task or provide information on a particular topic. This process can be cumbersome and inefficient, requiring users to adapt to different interfaces and interaction paradigms for each service they engage with. Moreover, these platforms are often siloed, operating independently of each other, which makes it difficult to perform tasks that may require the orchestration of multiple services or the retrieval of information from disparate sources.

SUMMARY

To address the above issues, a computing system is provided for managing specialized tasks and information retrieval processes. According to one aspect, the computing system includes processing circuitry configured to execute a plurality of agents, each agent configured to perform tasks and/or retrieve information in a specialized domain based on natural language input, cause an interaction interface for a trained generative model to be instantiated, receive, via the interaction interface, a message from a user for the trained generative model to generate an output, generate a context of the message, generate a request including the context and the message, execute an orchestrator configured to: receive the request, determine, based on the context, one or more agents of a plurality of agents to handle the request, input the request into the one or more agents of the plurality of agents to perform a task and/or retrieve information in specialized domains of the one or more agents, generate a prompt based on the retrieved information and/or the performed task and the message from the user, provide the prompt to the trained generative model, receive, in response to the prompt, a response from the trained generative model, and output the response to the user.

According to another aspect, the computing system includes processing circuitry and associated memory configured to implement an interaction interface, an orchestrator configured to perform semantic decision based routing, and a plurality of agents. The orchestrator is configured to receive a request including a message having natural language input from the interaction interface, make a semantic-based routing decision using a trained generative language model to identify a subset of the plurality of agents for routing the request, and send the request to each of the subset of agents. The orchestrator is further configured to receive information from one or more of the subset of agents in response the request, input a response generation prompt along with the message and the information from the one or more subset of agents into the trained generative language model or another trained generative language model, to thereby generate a natural language response to the request, and output the natural language response via the interaction interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
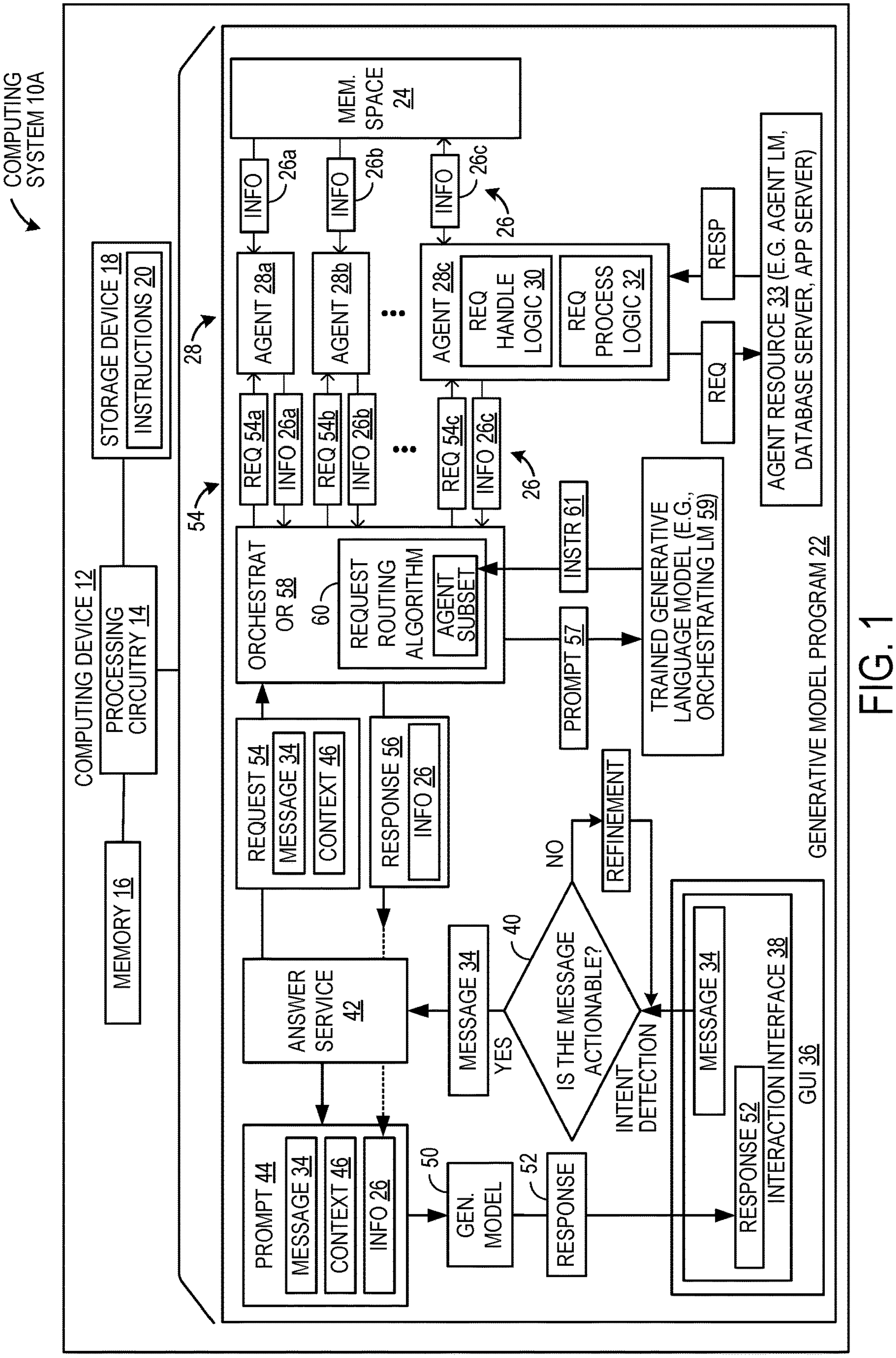
FIG. 1 is a schematic view showing a computing system according to a first example implementation, which uses a trained generative language model to generate a response to a message.

To address the issues described above, FIG. 1 illustrates a schematic view of a computing system 10A for managing specialized tasks and information retrieval processes, according to a first example implementation. For the sake of clarity, the trained generative model 50 will be henceforth referred to as a trained generative language model 50. However, it will be noted that the term 'trained generative language model' is merely illustrative, and the underlying concepts encompass a broader range of generative models, including multi-modal models, diffusion models, and generative adversarial networks, which may receive text, image, and/or audio inputs and generate text, image, and/or audio outputs, as discussed in further detail below.

The computing system 10A includes a computing device 12 having processing circuitry 14, memory 16, and a storage device 18 storing instructions 20. In this first example implementation, the computing system 10A takes the form of a single computing device 12 storing instructions 20 in the storage device 18, including a generative model program 22 that is executable by the processing circuitry 14 to perform various functions including executing a plurality of agents 28, causing an interaction interface 38 for a trained generative model 50 to be presented, receiving, via the interaction interface 38, a message 34 from the user, extracting a context 46 of the message 34, and generating a request 54 including the context 46 and the message 34.

The processing circuitry 14 further executes an orchestrator 58 configured to receive the request 54, which is natural language input from the interaction interface 38, determine based on the context 46, one or more agents 28 of a plurality of agents 28*a-c* to handle the request 54, and input the request 54 into the one or more agents 28 of the plurality of agents 28*a-c* to perform a task and/or retrieve information in specialized domains of the one or more agents 28.

Further, the processing circuitry 14 generates a prompt 44 based on the retrieved information 26 and/or the performed task and the message 34 from the user, provide the prompt 44 to the trained generative model 50, receive, in response to the prompt 44, a response 52 from the trained generative model 50, and output the response 52 to the user.

The processing circuitry 14 is configured to cause an interaction interface 38 for the trained generative language model 50 to be presented. In some instances, the interaction interface 38 may be a portion of a graphical user interface (GUI) 36 for accepting user input and presenting information to a user. In other instances, the interaction interface 38 may be presented in non-visual formats such as an audio interface for receiving and/or outputting audio, such as may be used with a digital assistant. In yet another example the interaction interface 38 may be implemented as an interaction interface application programming interface (API). In such a configuration, the input to the interaction interface 38 may be made by an API call from a calling software program to the interaction interface API, and output may be returned in an API response from the interaction interface API to the calling software program. The API may be a local API or a remote API accessible via a computer network such as the Internet. It will be understood that distributed processing strategies may be implemented to execute the software described herein, and the processing circuitry 14 therefore may include multiple processing devices, such as cores of a central processing unit, co-processors, graphics processing units, field programmable gate arrays (FPGA) accelerators, tensor processing units, etc., and these multiple processing devices may be positioned within one or more computing devices, and may be connected by an interconnect (when within the same device) or via a packet switched network links (when in multiple computing devices), for example. Thus, the processing circuitry 14 may be configured to execute the interaction interface API (for example, interaction interface 38) for the trained generative model 50, so that the processing circuitry 14 is configured to interface with the trained generative model 50 that receives input of the prompt 44 including natural language text input and, in response, generates a response 52 that includes natural language text output. Likewise, communications between the orchestrator 58 and agents 28 and the trained generative language model 59 and agent resources 33 can be implemented using local or remote APIs.

In general, the processing circuitry 14 may be configured to receive, via the interaction interface 38 (in some implementations, the interaction interface API), natural language text input 34, which is incorporated into a prompt 44. The answer service 42 generates the prompt 44 based at least on natural language text input 34 from the user. The prompt 44 is provided to the trained generative model 50. The trained generative language model 50 receives the prompt 44, which includes the natural language text input 34 from the user for the trained generative language model 50 to generate a response 52, and generates, in response to the prompt 44, the response 52 which is outputted to the user. It will be understood that the natural language text input 34 may also be generated by and received from a software program, rather than directly from a human user. It will also be understood that each of the trained generative language models described herein operates on natural language input that is tokenized into a vector of input tokens, and generates a vector of output tokens as a result, which is then converted into natural language output.

The trained generative language model 50 is a generative model that has been configured through machine learning to receive input that includes natural language text and generate output that includes natural language text in response to the input. It will be appreciated that the trained generative language model 50 can be a large language model (LLM) having tens of millions to billions of parameters, non-limiting examples of which include GPT-3, BLOOM, and LLaMa-2. The trained generative language model 50 can be a multi-modal generative model configured to receive multi-modal input including natural language text input as a first mode of input and image, video, or audio as a second mode of input, and generate output including natural language text based on the multi-modal input. The output of the multi-modal model may additionally include a second mode of output such as image, video, or audio output. Non-limiting examples of multi-modal generative models include Kosmos-2 and GPT-4 VISUAL. Further, the trained generative language model 50 can be configured to have a generative pre-trained transformer architecture, examples of which are used in the GPT-3 and GPT-4 models.

To manage specialized tasks and information retrieval processes, an interaction interface 38 is provided by which a message 34 can be received as user input. At decision point 40, the system 10A determines whether the message 34 is actionable, and if so then attempts to generate a response 52 to the message 34 using the generative model 50, calling an answer service 42 to generate a response 52. When the system 10A determines that the message 34 contains a plurality of actionable parts, the message 34 may be divided into a plurality of parts.

The answer service 42 extracts a context 46 from the message 34, and generates a request 54 comprising the message 34 and the context 46. The answer service 42 inputs the request 54 into the orchestrator 58 which is configured to route the request 54 to one of a plurality of agents 28*a-c*. In FIG. 1, three agents 28*a-c* are illustrated. However, the number of agents 28*a-c* is not particularly limited. The system 10A may accommodate fewer or more than three agents 28*a-c*.

When the message 34 is divided into a plurality of parts at decision point 40, the plurality of parts may be incorporated into a plurality of requests 54, respectively, and inputted into the plurality of agents 28*a-c*.

The orchestrator 58 may execute a request routing algorithm 60 to route the request 54 to one or more agents 28 of the plurality of agents 28*a-c*, determining, based on the context 46, the one or more agents 28 to handle the request 54. The orchestrator 58 then inputs the request 54 into the one or more agents 28 to perform a task and/or retrieve information in specialized domains of the one or more agents 28.

The request routing algorithm 60 may cause the orchestrator 58 to generate and send a prompt 57 to an orchestrating trained generative language model 59. The prompt 57 may include a question about how the request 54 is to be handled as well as the request 54 and the context 46. The orchestrating trained generative language model 59 may then generate and return an instruction 61 as to how the request 54 is to be handled. The orchestrating trained generative language model 59 may return an instruction 61 which commands the orchestrator 58 to input the request 54 into one or more specific agents among the plurality of agents 28. Accordingly, the orchestrator 58 may use the orchestrating trained generative language model 59 to make a semantic-based routing decision to identify a subset of the plurality of agents 28 for routing, and send the request 54, which is a natural language input, to each of the subset of the plurality of agents 28.

In response, the subset of the plurality of agents 28 may output natural language agent output 26*a-c*, which may be generated using the orchestrating trained generative language model 59 or another trained generative language model accessible by each of the plurality of agents 28. The orchestrator 58 may process the generative output from the one or more subset of agents 28 into a natural language response 56, and output the response 56 via the interaction interface 38. In one example, the raw output 26*a-c* from each of the subset S1 of agents 28 can be included as information 26 in response 56. In another example, the output 26*a-c* from each of the subset S1 of agents 28 can be sent in a prompt to the trained generative language model 59 along with an instruction to perform a processing operation (e.g., summarize, synthesize, enumerate, extract, etc.) the information in output 26*a-c* received from the subset S1 of agents in a predetermined format (e.g., as a list, outline, paragraph, multiple paragraphs, etc.) to generate the relevant information 26. In this way, the disparate information received from each agent 28 in the subset S1 can be sent in response 56 in a consistent format, which can improve the consistency of the response 52 generated by generative language model 50.

The orchestrator 58 may be configured to act as a router and/or a federator. When operating as a router, the orchestrator 58 intelligently directs the user request 54 to the most suitable agent 28 based on the context 46 of the request 54. When operating as a federator, the orchestrator 58 intelligently routes the user request 54 to multiple agents 28, collecting generated responses or results from the multiple agents 28, and merging the collected generated responses or results to arrive at a comprehensive result, which is subsequently outputted to the answer service 42 as the response 56, so that the prompt 44 is generated based on the merged responses. This federation may span multiple domains of expertise to achieve a multidisciplinary approach to fulfill a user request 54.

The agent 28*c* receiving the request 54 executes request handling logic 30 to receive the request 54 and determine whether the request 54 can be handled by the agent 28*c*. Responsive to determining that the request 54 can be handled by the agent 28*c*, the agent 28*c* executes request processing logic 32 to process the request 54 and perform a task and/or retrieve information in the specialized domain of the agent 28*c* receiving the request 54.

The agents 28 may be instantiated as specialized software modules configured to handle specific domains of tasks or requests. The agents 28 may be generative modules configured with specialized algorithms or processing capabilities to execute specific tasks in various specialized domains, which may include but are not limited to finance, healthcare, artwork, game design, and food services. The agents 28 are configured to retrieve information and/or perform tasks that directly align with their areas of expertise.

The agents 28 may operate in either an autonomous or consensus-driven mode. In an autonomous mode, the agents 28 may work independently and uncoordinated with one another. In a consensus-driven mode, the agents 28 may collaborate and arrive at a decision based on collective intelligence.

The agent 28 may execute request handling logic 30 to parse and process the context 46 of the incoming user request 54. The request 54 may be encoded in JSON, XML, or any other suitable data-interchange format that encapsulates the user's intent, query parameters, and other context-relevant information. The request handling logic 30 processes the user request 54 to generate actionable data, which becomes input for the request processing logic 32 executed by the agent 28.

The agent 28 may execute the request processing logic 32 to receive the actionable data and the parsed user request 54 from the request handling logic 30 and execute specialized tasks and/or retrieve relevant information 26*a* from a memory space 24 based on the interpreted user request 54. The request processing logic 32 may interact with APIs of other services to retrieve data or perform actions or directly interact with relational databases to run queries and retrieve relevant information 26*a*, for example.

For example, the first request 54*a* may be related to pizza ordering. The user may input the request 54*a*, "I want to order a pizza", and the request 54*a* may be inputted into a pizza agent 28*a* specializing in pizza. The orchestrator 58 may generate and send the orchestrating trained generative language model 59 a prompt 57 asking "name the appropriate agent(s) to handle a request to order a pizza", and the orchestrating trained generative language model 59 may generate and return an instruction 61 to route the request 54*a* to the pizza agent 28*a*. The request processing logic 32 of the pizza agent 28*a* may interface with various external APIs, such as those of pizza outlets, payment gateways, and delivery services to complete the task. Here, tasks could include restaurant selection, menu retrieval, pizza and topping selection, order placement, payment authorization, and delivery tracking.

The second request 54*b* may be related to healthcare. The user may input the request 54*b*, "I want to reorder my medications". The orchestrator 58 identifies the context 46 of this request 54*b* to be related to healthcare, and routes the request 54*b* to the healthcare agent 28*b* specializing in healthcare. The orchestrator 58 may generate and send the orchestrating trained generative language model 59 a prompt 57 asking "name the appropriate agent(s) to handle a request to reorder medications of a user", and the orchestrating trained generative language model 59 may generate and return an instruction 61 to route the request 54*b* to the healthcare agent 28*b*. The request processing logic 32 of the healthcare agent 28*b* may interact with electronic medical record databases to pull up patient history or medications, and even interface with pharmacy APIs to facilitate medication ordering.

The third request 54*c* may be related to game design and artwork. The user may input the request 54*c*, "I want to work on game design and artwork". The orchestrator 58 identifies the context 46 of this request 54*c* and routes the request 54*c* to the art agent 28*c* specializing in game design and artwork. The orchestrator 58 may generate and send the orchestrating trained generative language model 59 a prompt 57 asking "name the appropriate agent(s) to handle a request to work on game design and artwork", and the orchestrating trained generative language model 59 may generate and return an instruction 61 to route the request 54*c* to the art agent 28*c*. The art agent 28*c* then generates responses or resources which align with the request 54*c* of the user. When the art agent 28*c* receives a follow-up request from the user, such as "I want opinions," the orchestrator 58 may act as a federator and send the follow-up request to multiple agents such as a design critique agent, a game mechanics agent, and even a market analysis agent. Each agent 28 may provide its own perspective in accordance with its specialized domain, and the orchestrator 58 may merge these responses to produce a rounded response. Thus, the operation of the orchestrator 58 as a federator may be initiated by the request 54 from the user.

After retrieving relevant information 26 from the agents 28, the orchestrator 58 generates a response 56 containing the retrieved relevant information 26. The answer service 42 generates the prompt 44 based on the message 34 from the user, the context 46 extracted from the message 34, and the relevant information 26 retrieved by the orchestrator 58. The prompt 44 is inputted into the generative language model 50, which in turn generates the response 52 and returns the response 52 for display to the user via the interaction interface 38.

Figure 2:
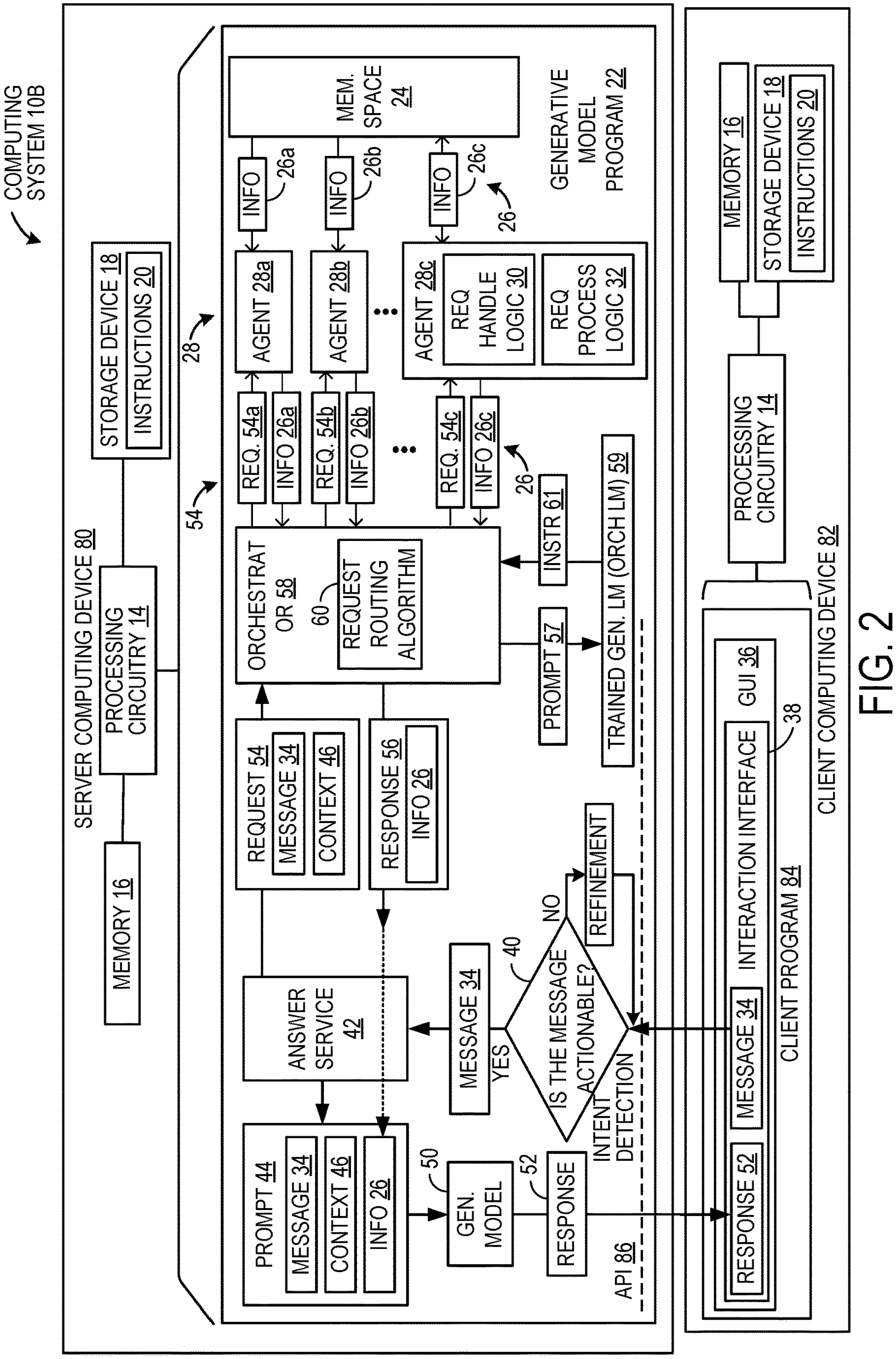
FIG. 2 is a schematic view showing a computing system according to a second example implementation, which also uses a trained generative language model to generate a response to a message.

Turning to FIG. 2, a computing system 10B according to a second example implementation is illustrated, in which the computing system 10B includes a server computing device 80 and a client computing device 82. Here, both the server computing device 80 and the client computing device 82 may include respective processing circuitry 14, memory 16, and storage devices 18. Description of identical components to those in FIG. 1 will not be repeated. As shown in FIG. 2, the generative model 50 and the generative model program 22 can be executed on a different server 80 from the computing device 82 executing the interaction interface 38, and the client program 84 executed on the computing device 82 can send a request or message 34 to an API 86 of the generative model program 22 on the different server 80 across a computer network such as the Internet, and in turn receive a response, in some examples.

The client computing device 82 may be configured to present the interaction interface 38 as a result of executing a client program 84 by the processing circuitry 14 of the client computing device 82. The client computing device 82 may be responsible for communicating between the user operating the client computing device 82 and the server computing device 80 which executes the generative model program 22 and contains the orchestrator 58, respective agents 28, and the generative model 50, via an API 86 of the generative model program 22. The client computing device 82 may take the form of a personal computer, laptop, tablet, smartphone, smart speaker, etc. The same processes described above with reference to FIG. 1 may be performed, except in this case the natural language text input 34 and output 52 may be communicated between the server computing device 80 and the client computing device via a network such as the Internet.

Further, the generative language model 50 may be executed on a different server from the server computing device 80 depicted in FIG. 2. In such an embodiment, the server computing device 80 may invoke an API call to transmit a data request to a different external server executing the generative language model 50. Upon receipt of the data request, the external server may decode the incoming API call and extract input parameters, receiving input of the prompt including natural language text input. The API of the generative language model 50, acting as a gateway, may channel the input of the prompt into the generative language model 50 for processing. The generative language model 50, executed on the external server, may perform its operations and generate a response that includes natural text output. The response may be encapsulated by the API of the generative language model 50 and transmitted back to the server computing device 80, which receives, in response to the prompt, the response from the trained generative model 50, and output the response to the user.

Figure 3:
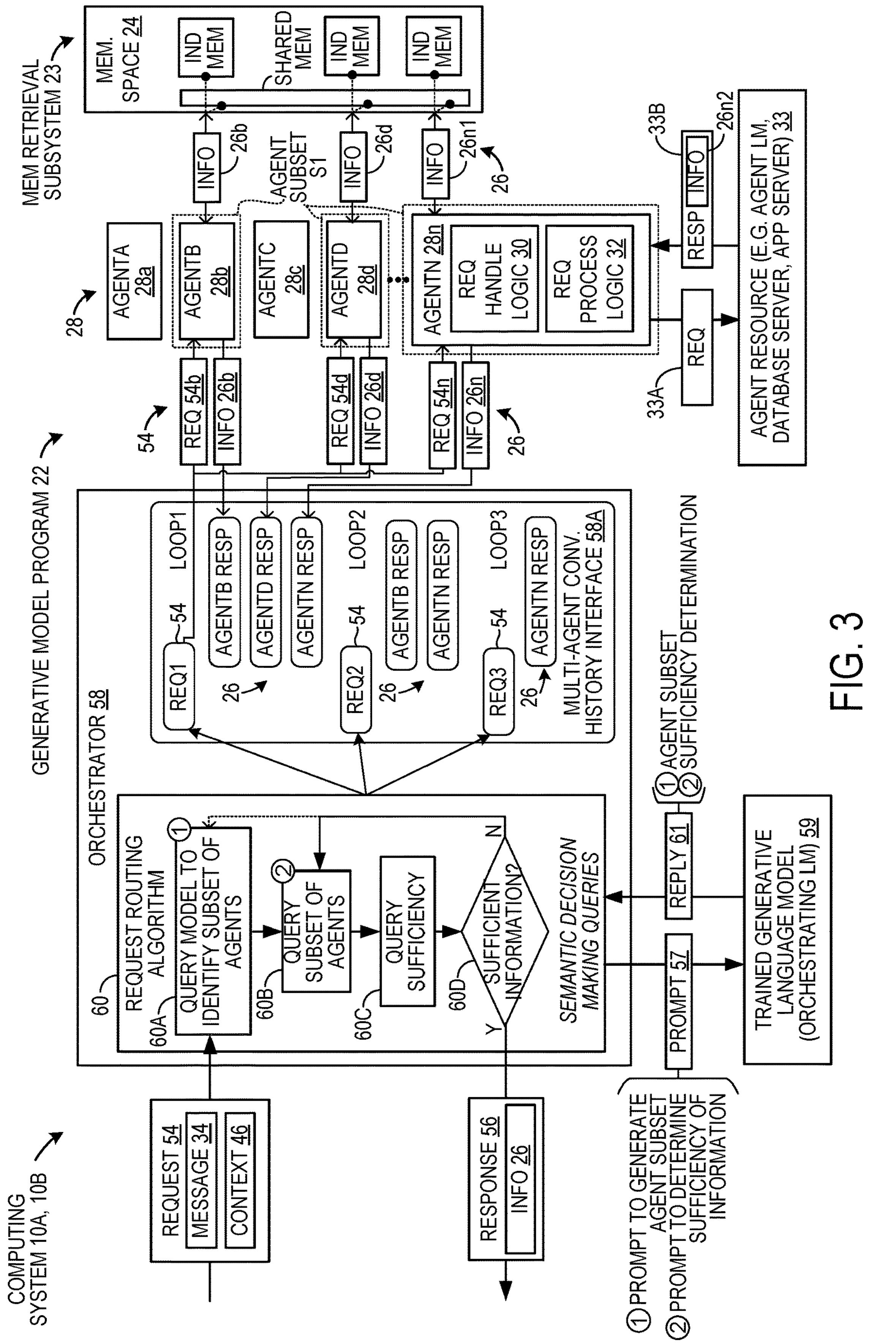
FIG. 3 is a detailed view showing the functions of an orchestrator in routing requests for information relevant to generating the response to the message to a subset of a plurality of response agents of the computing system of FIGS. 1 and 2.

Turning now to FIG. 3, interaction between the orchestrator 58 and the plurality of agents 28 of FIG. 1 or 2 is shown in detail. Initially, a natural language input is received at the orchestrator 58 in the form of message 34 from the interaction interface 38 shown in FIG. 1. The message 34 is typically received in a request 54, which also includes context 46. The message 34 is typically input by a user, and the context 46 typically includes a user interaction history of messages exchanged between the generative model and user in a session. The orchestrator 58 is configured to route the request 54 to one or more of a plurality of response agents 28, each of which can be configured with a unique persona and/or set of skills for responding to the request 54. Agents 28 are configured to generate information 26 to respond to request 54 using one or more agent resources 33. Agent resources 33 can include an agent language model, which can be a trained generative language model such as the orchestrating language model 59 and/or generative model 50, or another trained generative language model. Agent resources 33 can additionally or alternatively include a relational database, application server, or other data source.

The orchestrator 58 is configured to perform semantic decision based routing according to a request routing algorithm 60. The orchestrator 58 makes semantic routing decisions by communicating with a trained generative language model, such as orchestrating language model 59, according to the request routing algorithm 60. As used herein the phrase "semantic decision based routing" refers to a routing process by which requests 54 are routed to agents 28 based upon a decision made by the trained generative language model 59, based on natural language input (for example, semantic input), such as prompt 57. The semantic decision takes the form of natural language output (for example, semantic output) of the trained generative language model, such as instruction 61.

The request routing algorithm 60 can be programmed to configure the orchestrator 58 to operate in a plurality of routing modes, such as a router mode, a federator mode, and an event bus mode. In the router mode, the orchestrator 58 routes incoming requests 54 to a selected agent that the orchestrator 58 selects to receive the request 54 based on a semantic match of an agent definition indicating the persona, function, and skills of the agent to the semantic content of the request 54. In the federator mode, the orchestrator 58 routes the request 54 to all or a plurality of agents 28 and each agent determines for itself whether and how to respond, for example, by querying a generative language model with the request 54 and an agent definition for itself, and a prompt requesting a response only if a highly relevant response can be generated, for example. In the event bus mode, the orchestrator 58 can label the request 54 with event tags and communicate them to all agents 28, and the agents 28 examine the request 54 for event tags that it is configured to respond to, and respond to a request 54 only if a matching event tag is present.

Because the orchestrator 58 engages in semantic decision making to route requests 54, it will be appreciated that that the prompt 57 can be configured to instruct the trained generative language model 59 regarding the routing modes. For example, the prompt may say "Identify a subset of agents selected from the following candidate agents, which can reply with relevant content to the following request. Respond with a list of agents that are predicted with a high degree of confidence to respond with relevant information. The following agents are available as candidate agents: Agent A configured to perform a first function, Agent B configured to perform a second function, Agent C configured to perform a third function, and Agent D configured to perform a fourth function. Selection of multiple agents is permitted. Route according to a federator mode. The Request is as follows, and includes a message ("message text") and a context ("context")." In this prompt, statements such as "Agent A configured to perform a first function" are examples of an agent definition. Of course, it will be appreciated that the agent definition can be more precise in some examples, listing specific skills that the agent is configured to perform (order pizza, make travel reservations, write a poem, evaluate a mathematical problem, etc.), a persona of the model, etc.

In this manner, the orchestrator 58 is configured to make a semantic-based routing decision using the trained generative language model, (for example, orchestrating language model 59), to identify a subset S1 of the plurality of agents 28 for routing, and is further configured to send the natural language input (for example, message 34 and context 46 in request 54) to each agent 28 of the subset S1 of the plurality of agents 28. At 60A, the orchestrator 58 is configured to query the trained generative language model (for example, orchestrating model 59) using a prompt 57 that prompts the model 59 to generate the subset S1 of agents 28 (in this example, including Agents B, D and N). The subset S1 is returned to the orchestrator 58 in reply 61 received from the trained generative language model 59. At 60B, the orchestrator 58 is configured to query each of the subset S1 of agents 28, by sending copies **54*b*, 54*d*, 54*n* of request 54 including the context 46 and message 34 containing the natural language input to each of agent 28*b*, 28*d*, and 28*n* in agent subset Si. Agents B, D, and N in turn each generate relevant information 26 (26*b*, 26*d*, 26*n*) for responding to the request, if they can do so with sufficient confidence. To generate relevant information 26, each agent 28 can utilize request handing logic 30 to query available agent resources 33 and individual memory (for example, agent-specific memory) and shared memory (for example, memory available to all agents 28) within agent memory space 24. Memory requests and replies with information 26 can be exchanged between agents 28 and memory space 24 using a memory retrieval subsystem 23. Agent resources 33 may include an agent generative language model, a database server, or an application server, as some examples. Request processing logic 32 can suitably process information 26*n*2 from agent resources 33 and information 26*n*1 from memory space 24, to form the information 26*n* returned to the orchestrator 58**.

In response to forwarding the requests 54, the orchestrator 58 is configured to receive information 26 from one or more of the subset S1 of agents, the information 26 being generated by the agent 28 using the one or more agent resources 33. The information 26 received from each agent 28 is returned to the shared multi-agent conversation history interface 58A. One request and responses from each responding agent form a first conversation loop between the orchestrator 58 and subset S1 of agents. The conversation between the orchestrator 58 and agents 28 occurs in conversation loops that take place in the multi-agent conversation history interface 58A, with each loop being a turn in a turn-based conversation between the orchestrator 58 and all agents. During each loop, the same request 54 is sent to each of the subset S1 of agents 28. Thus REQ1 is sent in LOOP1 to each agent 28. Once a first loop has been completed, the orchestrator 58 at 60C performs a query to determine the sufficiency of the information 26 received from the subset S1 of agents 28 for responding to the request 54. The sufficiency determination is performed by sending a prompt 57 to determine the sufficiency of the information 26 to the trained generative language model (for example, orchestrating language model) 59. A sufficiency determination will be made by the trained generative language model 59 and returned in reply 61 to the orchestrator 58. At 60D, if it is determined that sufficient information 26 has been received (Y at 60D), then the orchestrator 58 returns the information 26 from the plurality of agents 28 to the answer service 42 depicted in FIG. 1, which passes it to the generative model 50 within prompt 44, to thereby generate response 52. If it is determined that the information 26 returned by the subset S1 of agents 28 is not sufficient (N at 60D) then the request routing algorithm 60 loops back to perform another agent conversation loop (LOOP1->LOOP2 or LOOP2->LOOP3) in the figure. In the illustrated example, during LOOP2, only Agent B and Agent N respond, whereas Agent D did not respond, indicating that Agent D determined it did not have relevant content for the request (REQ2). In the illustrated example, after LOOP2 it is again determined at 60D by the orchestrator 58 that the information 26 is insufficient, and hence LOOP3 is performed, during a new request REQ3 is sent to the subset S1 of agents, to which only Agent N responds. Following LOOP3, it is determined that the information 26 is sufficient (Y at 60D), and the information 26 gathered in from the subset S1 of agents 28 via the multi-agent conversation history interface 58A is returned in response 56 to the requesting answer service 42 of FIG. 1 or 2.

It will be appreciated that each of requests REQ1-REQ3 may include different prompts and will include the entire multi-agent conversation history in the multi-agent conversation history interface 58A as context. The prompts may be dynamically generated to request data determined lacking in a prior round of sufficiency determination for example. In this example, the sufficiency determination may not only include a YES/NO indication of sufficiency, but may also include one or more categories of information that are determined to be lacking in the information 26 thus far returned from the subset S1 of agents. The insufficient categories of information identified by the trained generative language model (for example, orchestrating model 59) during the sufficiency determination can be included in the request 54 sent to the subset S1 of agents 28 in subsequent conversation loops. In this way, lacking information can be requested. Further, since the entire multi-agent conversation history contained in interface 58A is included as context in each request 54, in subsequent loops each of the subset S1 of agents 28 is made aware of the information 26 in answers of other agents 28 in the prior conversation loops. Therefore, agents 28 can self-determine not to respond with duplicative information 26, or can supplement or build upon information 26 returned by other agents 28.

Figure 4:
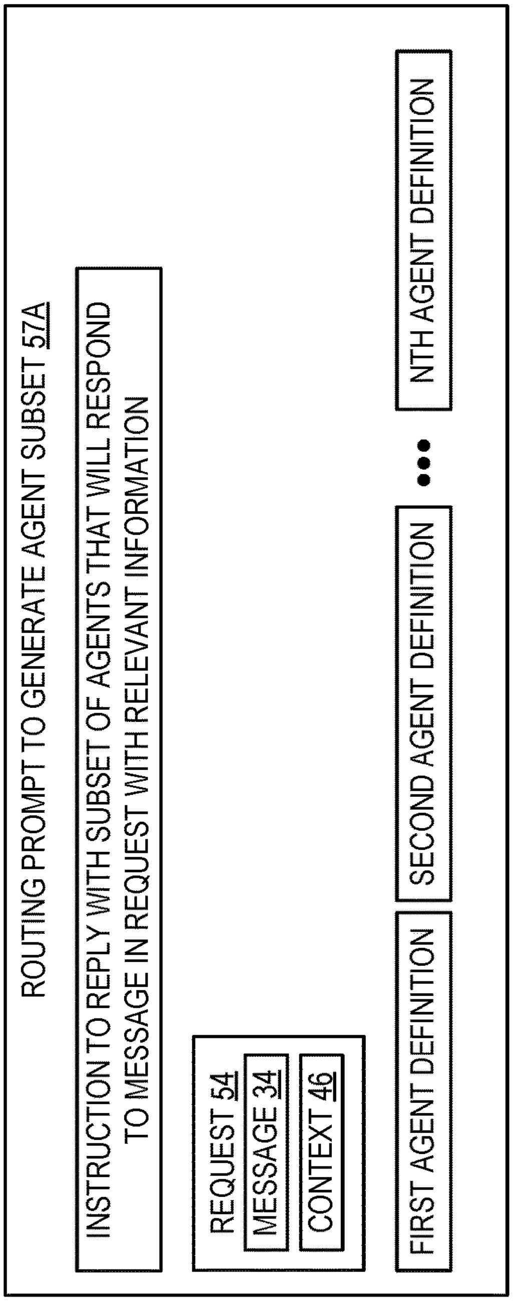
FIG. 4 is a schematic view of an example routing prompt to generate an agent subset, used by the computing systems of FIGS. 1-3.

Turning to FIG. 4, an example routing prompt 57A to generate an agent subset S1 is illustrated. The orchestrator 58 is configured to generate the routing prompt to generate an agent subset to which the request 54 is to be routed. The routing prompt 57A is generated to include an agent definition for each of the plurality of agents in the form of a natural language description of each of the plurality of agents, the message, and a natural language instruction to select the subset of agents (for example, to reply with a subset of agents that will respond to the message in the request with relevant information). The routing prompt 57A may also include a context 46 for the message 34, which may be a chat session history between the user and the trained generative language model prior to receipt of the message 34 in the interaction interface. The message 34 and context 46 may be included within the request 54 within the prompt. The orchestrator 58 is configured to send the routing prompt 57A (as prompt 57 in FIG. 3) to the trained generative language model 59 in FIG. 3. The trained generative language model 59 is configured to generate the subset S1 of agents in response to the routing prompt 57A (as prompt 57 in FIG. 3), and reply (for example, reply 61 in FIG. 3) with a list of the subset of agents. The instruction and agent definitions are sufficient to cause the trained generative language model 59 to generate the list of the subset S1 of agents. The orchestrator 58 is configured to receive the reply (for example, reply 61 in FIG. 3) with the subset S1 of agents from the trained generative language model 59.

Figure 5:
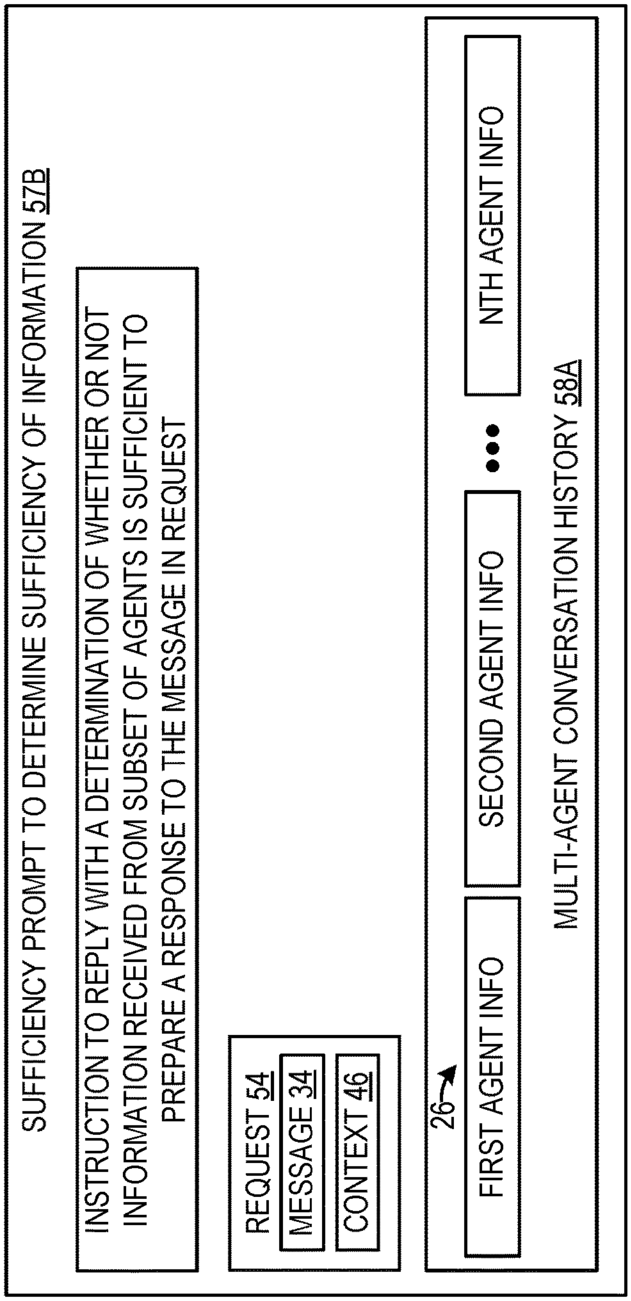
FIG. 5 is a schematic view of an example sufficiency prompt to determine sufficiency of information returned to the orchestrator from a subset of the plurality of agents, used by the computing systems of FIGS. 1-3.

Turning to FIG. 5, an example sufficiency prompt 57B to determine sufficiency of information received from the subset S1 of agents, is illustrated. As discussed above, the orchestrator 58 is configured to determine sufficiency of the information received from the subset S1 of agents to respond to the message 34 by sending a sufficiency prompt 57B (as prompt 57 in FIG. 3) to the trained generative language model or another trained generative language model, and to receive a response (as reply 61 in FIG. 3) from the trained generative language model (for example, trained generative language model 59) or another trained generative language model including a sufficiency determination, which is typically positive or negative (such as SUFFICIENT or INSUFFICIENT, or YES or NO, etc.). In this way, the sufficiency determination indicates whether or not the responses received from the subset of agents are sufficient to respond to the natural language input using a trained generative language model such as generative language model 50 of FIGS. 1 and 2. As illustrated in FIG. 5, the sufficiency determination prompt typically includes the information 26 in the response from each of the subset of agents contained within the multi-agent conversation history interface 58A, the natural language input in the message 34, and a natural language instruction to evaluate a sufficiency of the responses to respond to the natural language input. This information is sufficient to cause the trained generative language model 59 to output a sufficiency determination.

Figure 6:
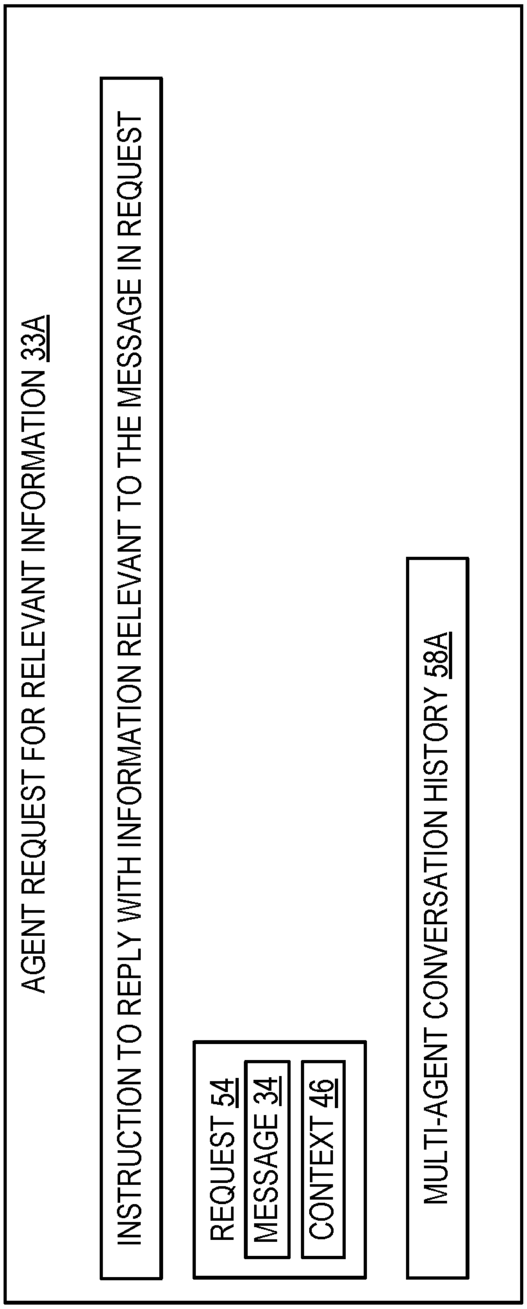
FIG. 6 is a schematic view of an example request to an agent for relevant information, used by the computing systems of FIGS. 1-3.
Figure 7:
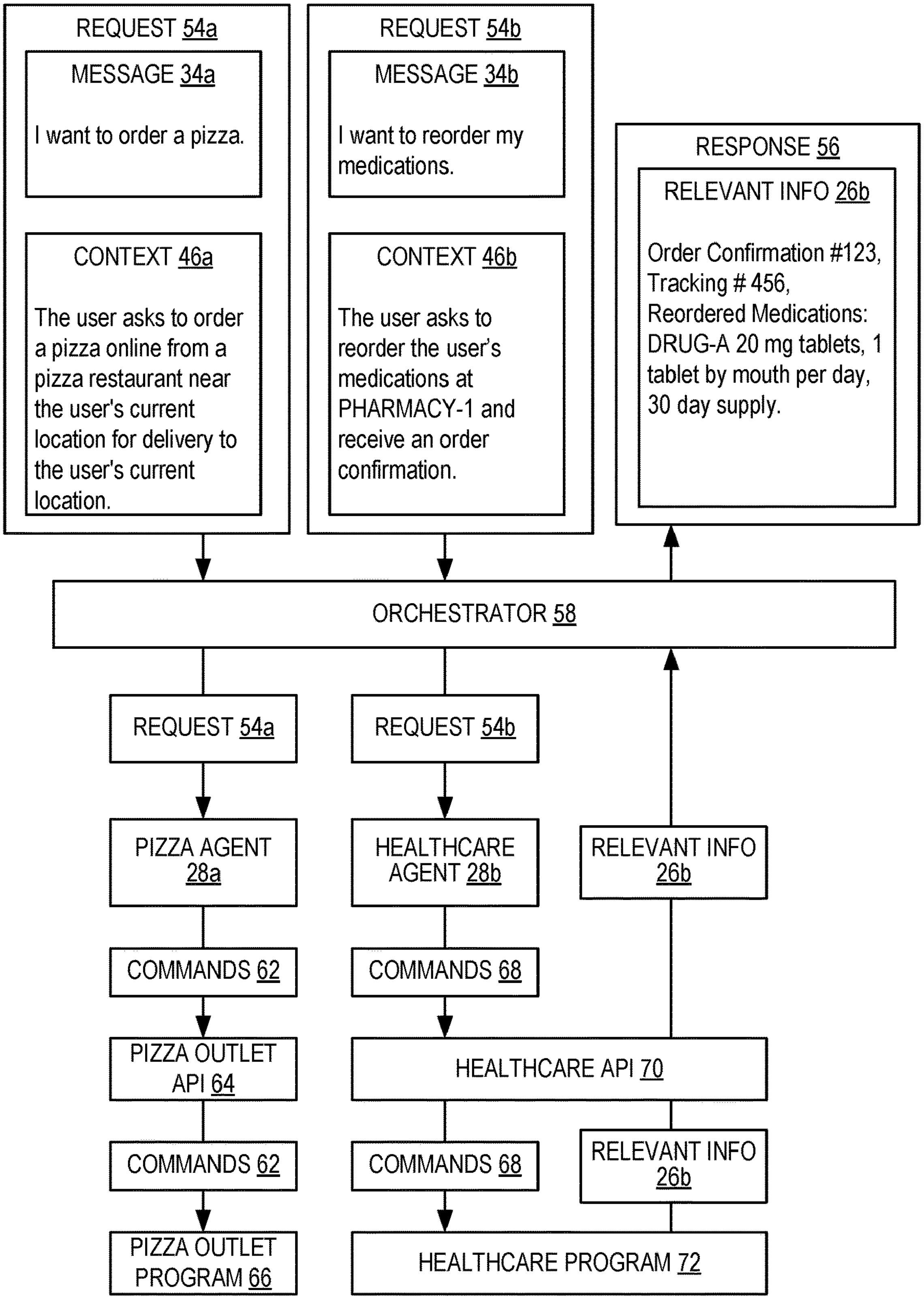
FIG. 7 is a schematic view showing inputs and outputs of the orchestrator of FIGS. 1-3 according to an example implementation.

Turning to FIG. 6, a request (such as request 33A in FIG. 3) of each of the subset S1 of agents 28 for relevant information 26 is shown. In this example, the request is in the form of a prompt for a trained generative language model, which is used when the agent resource for obtaining information 26 is a trained generative language model. In other examples, the request may be organized according other another data schema, such as a database query. The prompt includes an instruction to reply with information relevant to the message 34 in the request 54, the request 54 including the message 34 and context 46, and the multi-agent conversation history in the multi-agent conversation history interface 58A. This prompt is sent as request 33A from the agent 28 to the trained generative language model serving as the agent resource 33, and in response the agent resource 33 replies with relevant information in the response 33B. The requesting agent 28 then forwards the retrieved relevant information to the orchestrator 58. Turning to FIG. 7, an example is described of an orchestrator 58 which receives a first request 54*a* to executes commands 62 in accordance with the first request 54*a*. In this example, the answer service generates the first request 54*a* including a user's message 34*a*, "I want to order a pizza" and an extracted context 46*a*, which is determined to be "The user asks to order a pizza online from a pizza restaurant near the user's current location for delivery to the user's current location".

The orchestrator 58 converts the first request 54*a* into commands 62, and invokes an API call to transmit the commands 62 to the pizza agent 28*a*, which is coupled to a pizza outlet API 64. Alternatively, the pizza agent 28*a* may convert the first request 54*a* into commands 62 which can be processed by the pizza outlet API 64. The pizza outlet API 64, acting as a gateway, channels the commands 62 to a pizza outlet program 66 for processing. In response, the pizza outlet program 66 performs tasks in accordance with the first request 54*a*, such as restaurant selection, menu retrieval, pizza and topping selection, order placement, payment authorization, and delivery tracking.

The orchestrator 58 also receives a second request 54*b* to execute commands 68 and retrieve relevant information in accordance with the second request 54*b*. The answer service generates the second request 54*b* including a user's message 34*b*, "I want to reorder my medications". The answer service extracts the context 46*b* of the message 34*b* by identifying the core intent, which would be to "reorder medications". The extracted context 46*b* may also identify that the user is referring to a specific platform (PHARMACY-1, for example) as their usual online medication portal. The extracted context 46*b* is then determined to be "The user asks to reorder medications at PHARMACY-1 and receive an order confirmation". Thus, the context 46*b* may be extracted by referring to the user's personal information.

The orchestrator 58 converts the second request 54*b* into commands 68, and invokes an API call to transmit the commands 68 to the healthcare agent 28*b*, which is coupled to a healthcare API 70. The healthcare API 70, acting as a gateway, channels the commands 68 to a healthcare program 72 for processing. In response, the healthcare program 72 performs tasks in accordance with the second request 54*b*, such as logging into the user's online portal, reviewing the user's medication list, verifying the user's active prescription orders, verifying payment information, verifying insurance information, submitting the medication order, and sending an online confirmation with a tracking number.

The healthcare API 70 subsequently encapsulates the online confirmation with the tracking number as structured relevant information 26*c*, which is subsequently converted by the orchestrator 58 into a structured response 56 incorporating the retrieved relevant information 26*b*, and outputs the response 56 to the answer service, which uses the response 56 to generate a prompt to be inputted into the trained generative model. In this example, the retrieved relevant information 26*b* includes the order confirmation number, the tracking number, and the reordered medications, which are the DRUG-A 20 mg tablets, 1 tablet by mouth per day, 30 day supply. Thus, the retrieved information 26*b* includes a confirmation of the performed task, which is the reordering of the medication.

Figure 8:
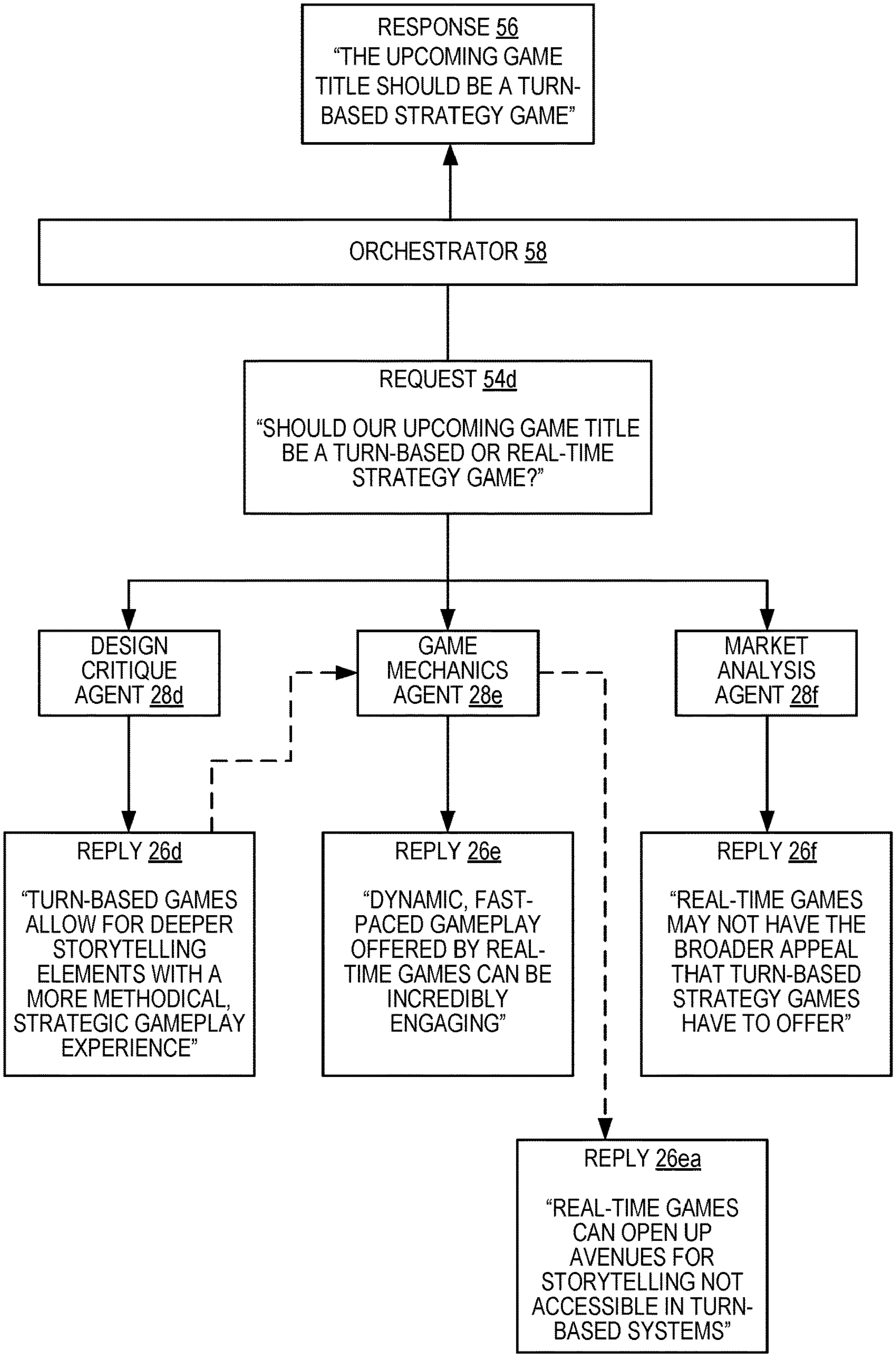
FIG. 8 is a schematic view showing inputs and outputs of the orchestrator of FIGS. 1-3 according to another example implementation.

Turning to FIG. 8, an example is described of a loop conversation which the plurality of agents 28 may have with each other to generate a response 56 based on semantic decision making. In this example, the orchestrator 58 makes a semantic-based routing decision using the orchestrating trained generative language model 59 to identify a subset of plurality of agents 28 for routing. Acting as a federator, the orchestrator 58 sends a fourth request 54*d* to a design critique agent 28*d*, a game mechanics agent 28*e*, and a market analysis agent 28*f*. The fourth request 54*d* is from a computer game executive asking for opinions about the future direction of an upcoming game title. The fourth request 54*d* is inputted into the design critique agent 28*d*, the game mechanics agent 28*e*, and the market analysis agent 28*f* to ask whether the upcoming game title should be a turn-based strategy game or a real-time strategy game.

Here, the design critique agent 28*d* responds with a reply 26*d* that turn-based strategy games offer a more methodical, strategic gameplay experience which allows for deeper storytelling elements. The game mechanics agent 28*e* relates with a reply 26*e* that dynamic, fast-paced gameplay offered by real-time strategy games can be incredibly engaging. The market analysis agent 28*f* argues with a reply 26*f* that, while real-time strategy games have a consistent, dedicated following, they may not have the broader appeal that turn-based strategy games may offer.

Agents 28 may receive the replies 26*d-f* of other agents as input and reply to them. For example, the game mechanics agent 28*e* may respond to the reply 26*d* of the design critique agent 28*d* with a follow-up reply 26*ea* that real-time strategy games can open up avenues for storytelling that are not as easily accessible in turn-based systems, such as offering the layers of complexity and urgency in time-sensitive quests or dynamic battlefield conditions.

Operating as a federator, the orchestrator 58 intelligently routes the user collects the generated replies 26*d*, 26*e*, 26*ea*, 26*f* from the multiple agents 28*d-f*, and merges the collected generated replies 26*d*, 26*e*, 26*ea*, 26*f* to arrive at a comprehensive result, which is subsequently outputted as the response 56. For example, the orchestrator 58 may generate a response 56 recommending that the upcoming game title should be a turn-based strategy game. The orchestrator 58 may be triggered to generate the response 56 responsive to determining that there was sufficient information in the conversation history entries of each of the multiple agents 28*d-f* to proceed and output the response 56.

Figure 9:
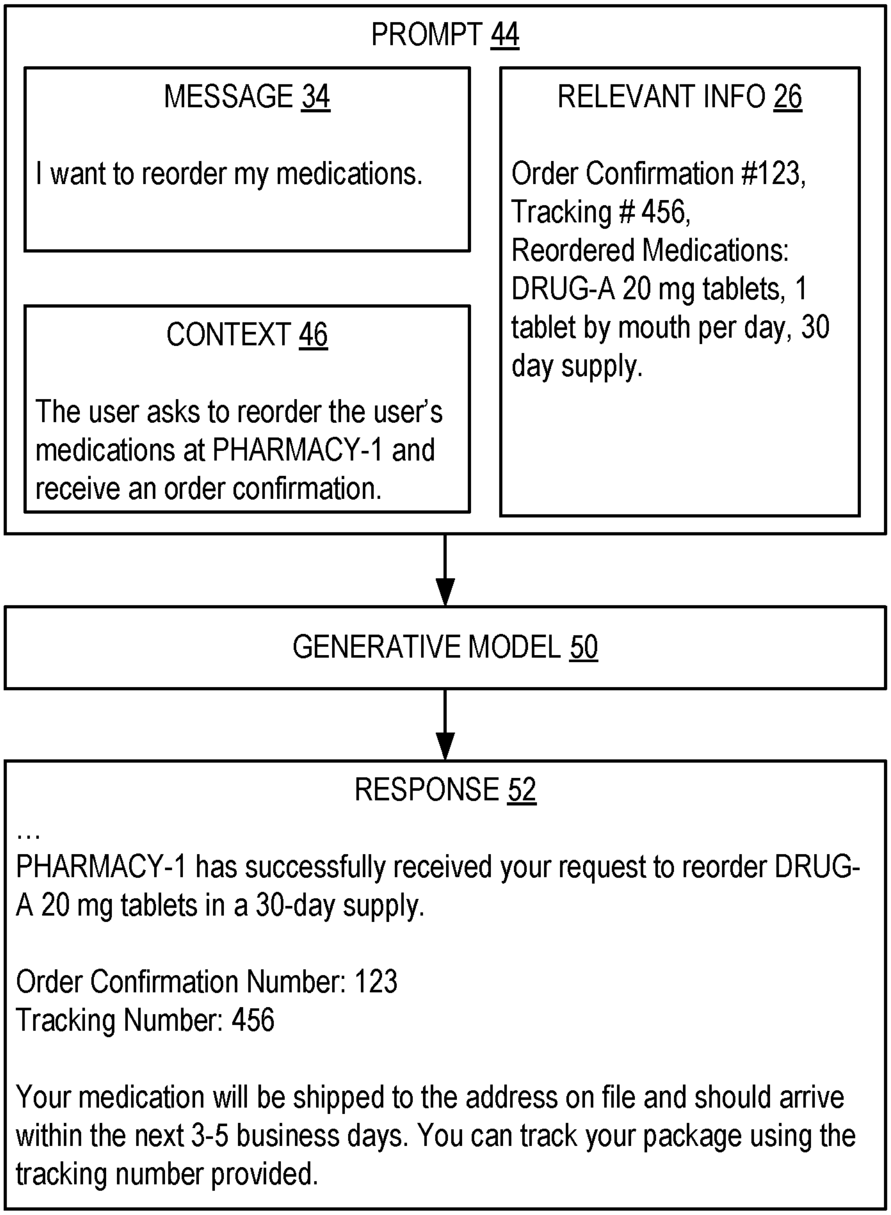
FIG. 9 is a schematic view showing an input and an output of the generative model of FIG. 1-3 according to an example implementation.

Turning to FIG. 9, an example is described of an inputted prompt 44 which is inputted into the generative model 50 to output a response 52. In this example, the retrieved relevant information 26 retrieved by the orchestrator 58 of FIG. 3 is incorporated into a prompt 44 that is generated by the answer service 42 of FIGS. 1 and 2. The prompt 44 generated by the answer service 42 also includes the message 34 from the user as well as the context 46 of the message 34 as shown in the example of FIG. 3. The generated response 52 addresses the message 34 from the user about reordering medications, and takes into consideration the retrieved relevant information 26, which include the order confirmation and a list of the reordered medication. The generated response 52 includes a notification that PHARMACY-1 has successfully reviewed the user's request to reorder DRUG-A 20 mg tablets in a 30-day supply, and that the medication will be shipped to the address on file and should arrive within the next 3-5 business days. The notification includes the order confirmation number and tracking number for the package including the user's reordered medication.

Figure 10:
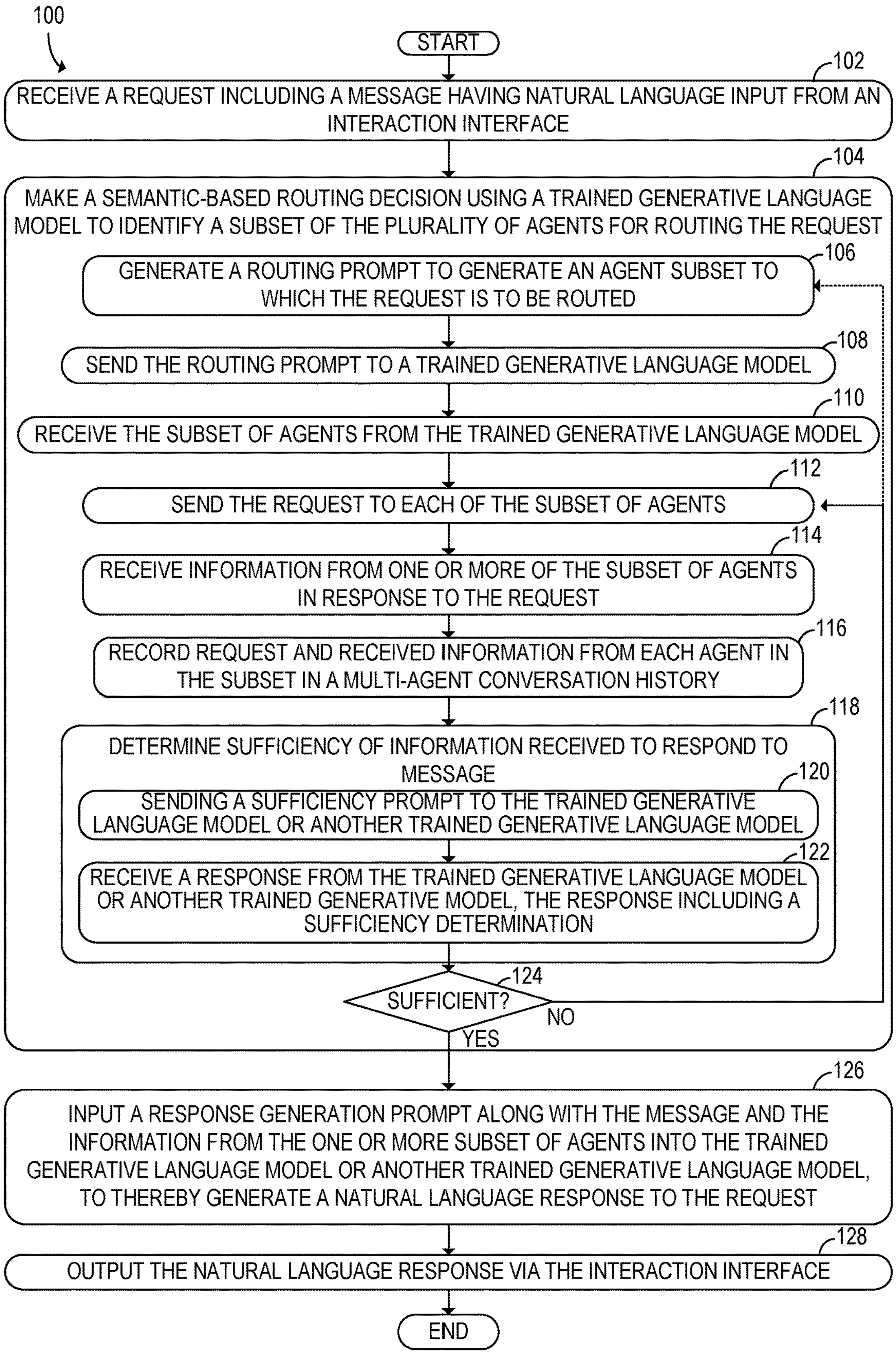
FIG. 10 shows a flowchart for a first method for use in routing requests for information relevant to generating a response to a message received via an interaction interface, via an orchestrator, to a subset of a plurality of response agents, according to one example implementation.

FIG. 10 is a flowchart that illustrates a first method 100 for orchestrating requests for relevant information to respond to a natural language input in a message. The first method 100 may be implemented on the computing system 10A or 10B illustrated in FIGS. 1-3 above, which include processing circuitry and associated memory configured to implement an interaction interface, an orchestrator configured to perform semantic decision based routing, and a plurality of response agents. Alternatively, other suitable computing hardware and software may be utilized.

At 102, the method includes, at the orchestrator, receiving a request including a message having natural language input from the interaction interface. The interaction interface may be a graphical user interface or an application programming interface configured to implement a turn-based chat session between a user and an instance of the generative language model 50 described above, or between two or more instances of generative language models.

At 104, the method includes, at the orchestrator, making a semantic-based routing decision using a trained generative language model to identify a subset of the plurality of agents for routing the request. Steps 106 through 124 may be performed to make the semantic-based routing decision. At 106, the method includes generating a routing prompt to generate an agent subset to which the request is to be routed. The routing prompt typically includes an agent definition for each of the plurality of agents in the form of a natural language description of each of the plurality of agents, the message, and a natural language instruction to select the subset of agents. At 108, the method includes sending the routing prompt to the trained generative language model, the trained generative language model being configured to generate the subset of agents in response to the routing prompt. At 110, the method includes receiving the subset of agents from the trained generative language model.

At 112, the method includes sending the request to each of the subset of agents. Each of the subset of agents attempts to generate or retrieve information relevant to the natural language input in the message in the request. In some examples, each of the agents can be configured to communicate with an agent resource to obtain the information relevant to the natural language input in the message. As some examples, agent resources such as the trained generative language model, another trained generative language model, a database server, or an application server can be utilized.

At 114, the method includes receiving information from one or more of the subset of agents in response to the request. At 116, the method includes recording the request and received information from each agent in the subset in a multi-agent conversation history readable and writable by each of the plurality of agents and by the orchestrator. In this way, the agents can know of the information in each other's responses. The writing may occur in multiple steps as soon as the information is available to the orchestrator, rather than in a single step as depicted in the flowchart.

At 118, the method includes, prior to outputting the natural language response at 128 below, determining the sufficiency of the information received to respond to the message. This may be accomplished at least in part by, at 120, sending a sufficiency prompt to the trained generative language model or another trained generative language model, and at 122, receiving a response from the trained generative language model or another trained generative language model including a sufficiency determination. The sufficiency determination prompt can include the response from each of the subset of agents, the natural language input, and a natural language instruction to evaluate a sufficiency of the responses to respond to the natural language input. The sufficiency determination can indicate whether or not the responses received from the subset of agents are sufficient to respond to the natural language input.

At 124, in response to a sufficiency determination that is negative (NO at 124 looping back to 112), the method may include performing one or more additional agent communication loops in which the orchestrator sends another request for relevant information to each of the subset of agents including (a) request for additional detail, (b) information about the negative determination of sufficiency, and/or (c) information about a conversation history between the subset of agents and the orchestrator thus far. As shown in dashed lines, instead of looping back to step 112, the method 100 may loop back to 106 to generate a new agent subset on each successive loop. In this way, the orchestrator can determine the subset of the plurality of agents on each additional agent communication loop. This enables the orchestrator to adjust and attempt to find different agent and agent resources with information relevant to the incoming message.

At 126, the method includes inputting a response generation prompt along with the message and the information from the one or more subset of agents into the trained generative language model or another trained generative language model, to thereby generate a natural language response to the request. At 128, the method includes outputting the natural language response via the interaction interface.

Figure 11:
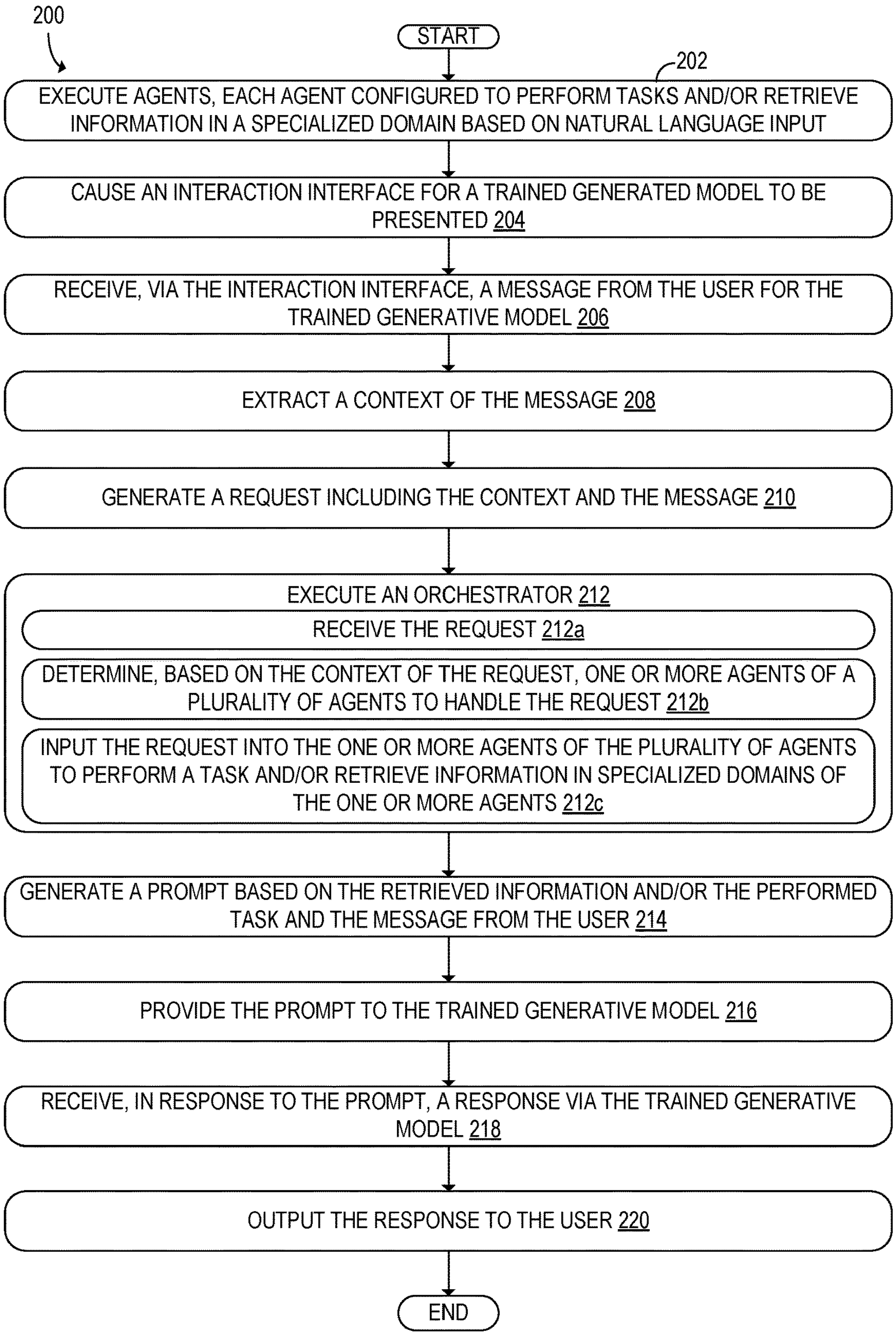
FIG. 11 shows a flowchart for a second method for managing specialized tasks and information retrieval processes according to one example implementation.

FIG. 11 shows a flowchart for a second method 200 for managing specialized tasks and information retrieval processes according to one example implementation. The second method 200 may be implemented by the computing system 10A or 10B illustrated in FIGS. 1-3, or other suitable computer hardware and software.

At step 202, a plurality of agents are executed, each agent configured to perform tasks and/or retrieve information in a specialized domain based on natural language input. At step 204, an interaction interface for a trained generative model is caused to be presented. At step 206, a message is received from the user, via the interaction interface, for the trained generative model. At step 208, a context of the message is extracted. At step 210, a request is generated including the context and the message. At step 212, an orchestrator is executed. At step 212*a*, the orchestrator receives the request. At step 212*b*, the orchestrator determines, based on the context, one or more agents of a plurality of agents to handle the request. At step 212*c*, the orchestrator inputs the request into the one or more agents of the plurality of agents to perform a task and/or retrieve information in specialized domains of the one or more agents.

At step 214, a prompt is generated based on the retrieved relevant information and/or the performed task and the message from the user. At step 216, the prompt is provided to the trained generative model. At step 218, in response to the prompt, a response is received from the trained generative model. At step 220, the response is outputted to the user.

Figure 12:
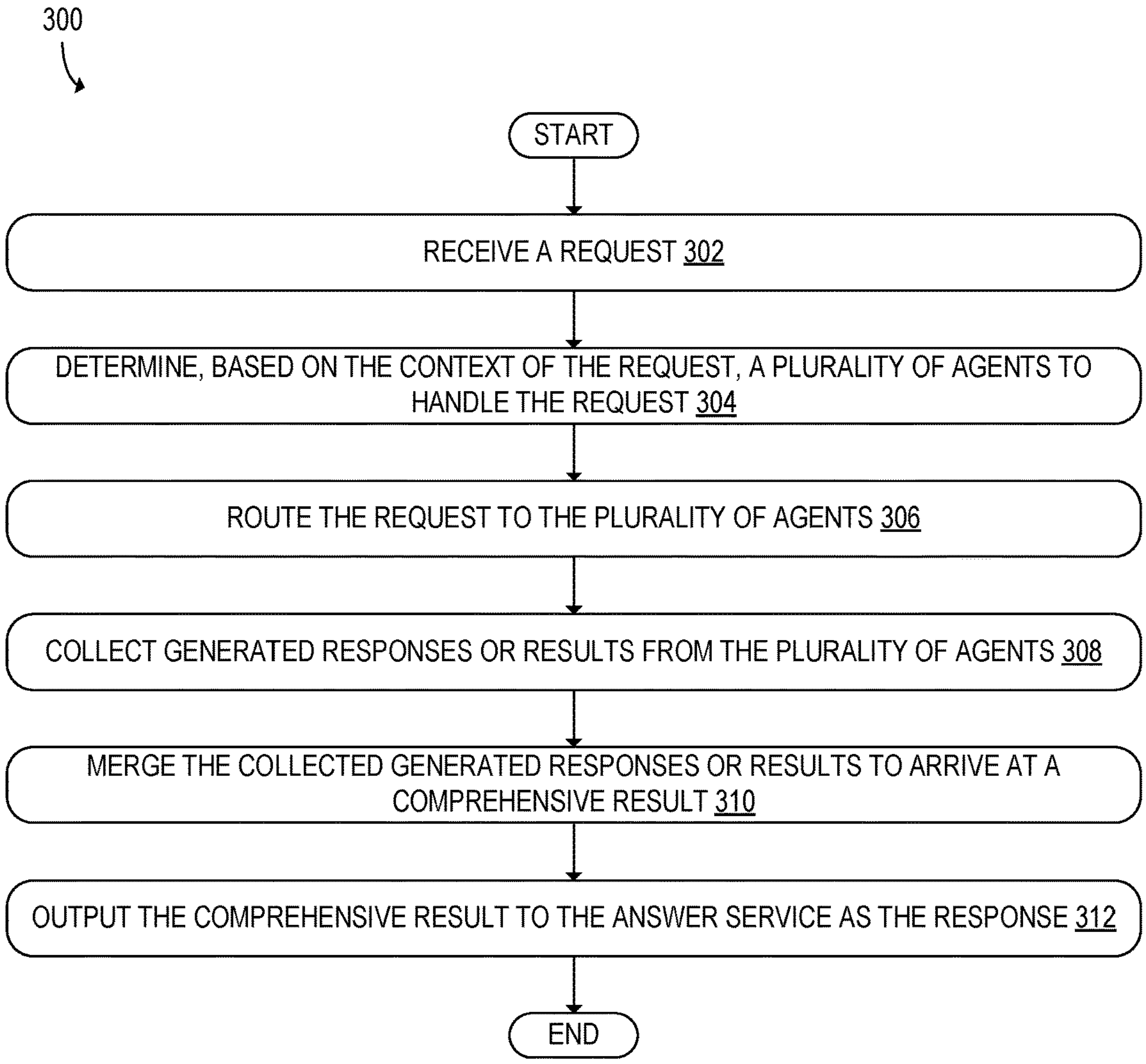
FIG. 12 shows a flowchart for a third method for an orchestrator operating as a federator according to one example implementation.

FIG. 12 shows a flowchart for a third method 300 for an orchestrator operating as a federator according to one example implementation. The third method 300 may be implemented by the orchestrator 58 of the computing systems illustrated in FIGS. 1-3, or other suitable computer hardware and software.

At step 302, a request is received by the orchestrator. At step 304, the orchestrator determines, based on the context of the request, a plurality of agents to handle the request. At step 306, the orchestrator routes the request to the plurality of agents. At step 308, the orchestrator collects generated responses or results from the plurality of agents. At step 310, the orchestrator merges the collected generated responses or results to arrive at a comprehensive result. At step 312, the comprehensive result is outputted to the answer service as the response.

The above-described systems and method may seamlessly manage a range of specialized tasks and information retrieval processes through a single interface by employing multiple agents, each with their own specialized area of expertise, and an orchestrator that intelligently routes user requests to the appropriate agent or agents, thereby streamlining the user experience in engaging with complex tasks and specialized information queries.

In some embodiments, the methods and processes described herein may be tied to a computing system of one or more computing devices. In particular, such methods and processes may be implemented as a computer-application program or service, an API, a library, and/or other computer-program product.

Figure 13:
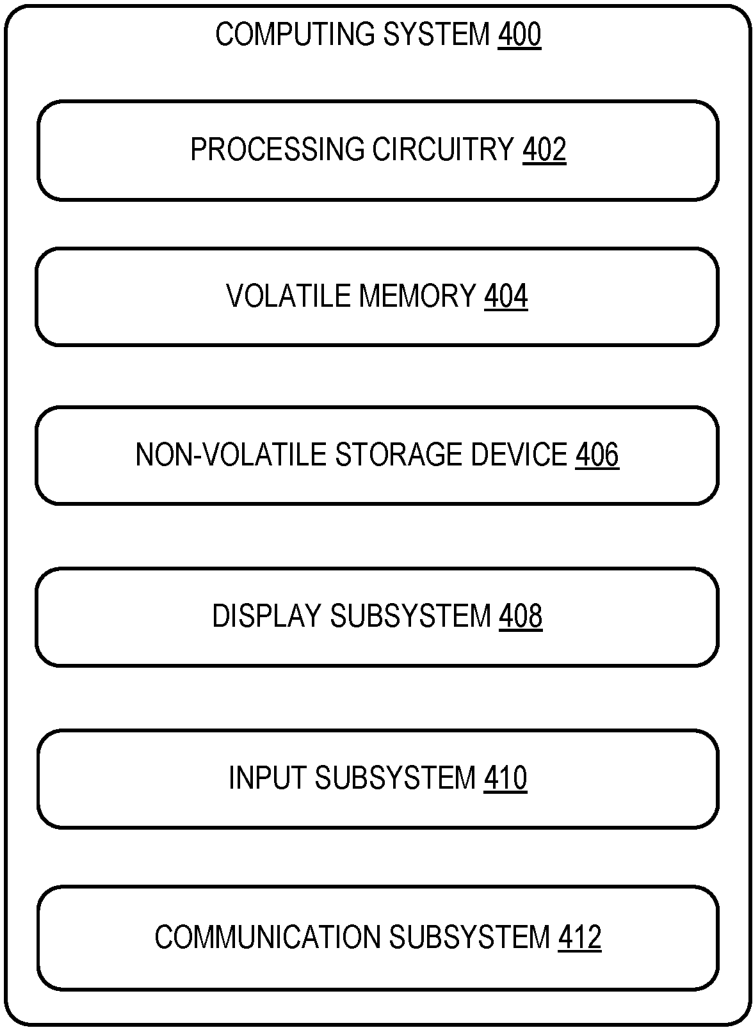
FIG. 13 shows a schematic view of an example computing environment in which the computing system of FIGS. 1-3 may be enacted.

FIG. 13 schematically shows a non-limiting embodiment of a computing system 400 that can enact one or more of the methods and processes described above. Computing system 400 is shown in simplified form. Computing system 400 may embody the computing systems 10A and 10B described above and illustrated in FIGS. 1 and 2, respectively. Components of computing system 400 may be included in one or more personal computers, server computers, tablet computers, home-entertainment computers, network computing devices, video game devices, mobile computing devices, mobile communication devices (for example, smartphone), and/or other computing devices, and wearable computing devices such as smart wristwatches and head mounted augmented reality devices.

Computing system 400 includes processing circuitry 402, volatile memory 404, and a non-volatile storage device 406. Computing system 400 may optionally include a display subsystem 408, input subsystem 410, communication subsystem 412, and/or other components not shown in FIG. 13.

Processing circuitry typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 402 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 402.

Non-volatile storage device 406 includes one or more physical devices configured to hold instructions executable by the processing circuitry to implement the methods and processes described herein. When such methods and processes are implemented, the state of non-volatile storage device 406 may be transformed—e.g., to hold different data.

Non-volatile storage device 406 may include physical devices that are removable and/or built in. Non-volatile storage device 406 may include optical memory, semiconductor memory, and/or magnetic memory, or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by processing circuitry 402 to temporarily store information during processing of software instructions. It will be appreciated that volatile memory 404 typically does not continue to store instructions when power is cut to the volatile memory 404.

Aspects of processing circuitry 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via processing circuitry 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included display subsystem 408 may be used to present a visual representation of data held by non-volatile storage device 406. The visual representation may take the form of a GUI. As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with processing circuitry 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, camera, or microphone.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 400 to send and/or receive messages to and/or from other devices via a network such as the Internet.

The following paragraphs provide additional support for the claims of the subject application. One aspect provides a computing system, comprising processing circuitry and associated memory configured to implement an interaction interface, an orchestrator configured to perform semantic decision based routing, and a plurality of agents, the orchestrator being configured to receive a request including a message having natural language input from the interaction interface, make a semantic-based routing decision using a trained generative language model to identify a subset of the plurality of agents for routing the request, send the request to each of the subset of agents, receive information from one or more of the subset of agents in response the request, input a response generation prompt along with the message and the information from the one or more of the subset of agents into the trained generative language model or another trained generative language model, to thereby generate a natural language response to the request, and output the natural language response via the interaction interface. In this aspect, additionally or alternatively, to make the semantic-based routing decision, the orchestrator may be configured to generate a routing prompt to generate the subset of agents to which the request is to be routed, the routing prompt including an agent definition for each of the plurality of agents in the form of a natural language description of each of the plurality of agents, the message, and a natural language instruction to select the subset of agents, and send the routing prompt to the trained generative language model, the trained generative language model being configured to generate the subset of agents in response to the routing prompt, and receive the subset of agents from the trained generative language model. In this aspect, additionally or alternatively, the prior to outputting the natural language response, the orchestrator may be configured to determine a sufficiency of the information received to respond to the message by sending a sufficiency prompt to the trained generative language model or another trained generative language model, and receive a response from the trained generative language model or another trained generative language model including the sufficiency determination. In this aspect, additionally or alternatively, the sufficiency determination prompt may include the response from each of the subset of agents, the natural language input, and a natural language instruction to evaluate a sufficiency of the responses to respond to the natural language input, the sufficiency determination indicating whether or not the responses received from the subset of agents are sufficient to respond to the natural language input. In this aspect, additionally or alternatively, the orchestrator may be configured to in response to a sufficiency determination that is negative, performing one or more additional agent communication loops in which the orchestrator sends another request for relevant information to each of the subset of agents including a (a) request for additional detail, (b) information about the negative determination of sufficiency, and/or (c) information about a conversation history between the subset of agents and the orchestrator thus far. In this aspect, additionally or alternatively, the subset of the plurality of agents may be determined by the orchestrator on each additional agent communication loop. In this aspect, additionally or alternatively, each of the agents may be configured to communicate with an agent resource to obtain the information relevant to the natural language input in the message, the agent resource may be the trained generative language model, another trained generative language model, a database server, or an application server.

Another aspect provides a computing system for managing specialized tasks and information retrieval processes, the computing system comprising processing circuitry configured to execute a plurality of agents, each agent configured to perform tasks and/or retrieve information in a specialized domain based on natural language input, cause an interaction interface for a trained generative model to be instantiated, receive, via the interaction interface, a message from a user for the trained generative model, extract a context of the message, generate a request including the context and the message, execute an orchestrator configured to receive the request, determine, based on the context, one or more agents of the plurality of agents to handle the request, input the request into the one or more agents of the plurality of agents to perform a task and/or retrieve information in specialized domains of the one or more agents, generate a prompt based on the retrieved information and/or the performed task and the message from the user, provide the prompt to the trained generative model, receive, in response to the prompt, a response from the trained generative model, and output the response to the user. In this aspect, additionally or alternatively, the trained generative model may be a trained generative language model having a generative pre-trained transformer architecture. In this aspect, additionally or alternatively, the orchestrator may be further configured to operate as a federator by collecting generated responses from the one or more agents, and merging the collected generated responses, so that the prompt is generated based on the merged responses. In this aspect, additionally or alternatively, the plurality of agents may operate in either an autonomous mode or a consensus-driven mode. In this aspect, additionally or alternatively, the one or more agents may be configured to interact with application programming interfaces (APIs) of services to perform actions, and the request may be converted into commands which are processed by the APIs of the services. In this aspect, additionally or alternatively, the one or more agents may be configured to interact with application programming interfaces (APIs) of services to run queries on relational databases. In this aspect, additionally or alternatively, the retrieved information may include a confirmation of the performed task.

Another aspect provides a computing method for managing specialized tasks and information retrieval processes, the computing method comprising executing a plurality of agents, each agent configured to perform tasks and/or retrieve information in a specialized domain based on natural language input, causing an interaction interface for a trained generative model to be presented, receiving, via the interaction interface, a message from a user for the trained generative model, extracting a context of the message, generating a request including the context and the message, executing an orchestrator configured to receive the request, determine, based on the context, one or more agents of the plurality of agents to handle the request, input the request into the one or more agents of the plurality of agents to perform a task and/or retrieve information in specialized domains of the one or more agents, generating a prompt based on the retrieved information and/or the performed task and the message from the user, providing the prompt to the trained generative model, receiving, in response to the prompt, a response from the trained generative model, and outputting the response to the user. In this aspect, additionally or alternatively, the trained generative model may be a trained generative language model having a generative pre-trained transformer architecture. In this aspect, additionally or alternatively, the orchestrator may be further configured to operate as a federator by collecting generated responses from the one or more agents, and merging the collected generated responses, so that the prompt is generated based on the merged responses. In this aspect, additionally or alternatively, the plurality of agents may operate in either an autonomous mode or a consensus-driven mode. In this aspect, additionally or alternatively, the one or more agents may be configured to interact with application programming interfaces (APIs) of services to perform actions, and the request may be converted into commands which are processed by the APIs of the services. In this aspect, additionally or alternatively, the one or more agents may be configured to interact with application programming interfaces (APIs) of services to run queries on relational databases.

"And/or" as used herein is defined as the inclusive or V, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:

processing circuitry and associated memory configured to implement:

an interaction interface;

an orchestrator configured to perform semantic decision based routing; and a plurality of agents, wherein the orchestrator is configured to:

receive a request including a message having natural language input from the interaction interface, make a semantic-based routing decision by:

providing a routing prompt including a natural language description of each of the plurality of agents, the message, and a natural language instruction to select a subset of the plurality of agents, and inputting the routing prompt into a trained generative language model to identify the subset of the plurality of agents for routing the request, the trained generative language model trained, prior to deployment, to perform semantic routing decisions based on natural-language agent definitions, routing prompts, and routing outcomes, send the request to each of the subset of the plurality of agents, receive information from one or more of the subset of the plurality of agents in response to the request, input a response generation prompt along with the message and the information from the one or more of the subset of the plurality of agents into the trained generative language model or another trained generative language model, to thereby generate a natural language response to the request, and output the natural language response via the interaction interface.

2. The computing system of claim 1, wherein to make the semantic-based routing decision, the orchestrator is configured to:

send the routing prompt to the trained generative language model, the trained generative language model being configured to generate the subset of the plurality of agents in response to the routing prompt, and receive the subset of the plurality of agents from the trained generative language model.

3. The computing system of claim 2, wherein prior to outputting the natural language response, the orchestrator is configured to:

determine a sufficiency of the information received to respond to the message by sending a sufficiency prompt to the trained generative language model or another trained generative language model, and receive a response from the trained generative language model or another trained generative language model including the sufficiency determination.

4. The computing system of claim 3, wherein the sufficiency prompt includes:

the response from each of the subset of the plurality of agents, the natural language input, and an instruction in natural language to evaluate a sufficiency of the responses to respond to the natural language input, the sufficiency determination indicating whether or not the responses received from the subset of the plurality of agents are sufficient to respond to the natural language input.

5. The computing system of claim 4, wherein the orchestrator is configured to:

in response to a sufficiency determination that is negative, performing one or more additional agent communication loops in which the orchestrator sends another request for relevant information to each of the subset of the plurality of agents including a (a) request for additional detail, (b) information about the negative determination of sufficiency, and/or (c) information about a conversation history between the subset of the plurality of agents and the orchestrator thus far.

6. The computing system of claim 5, wherein the subset of the plurality of agents is determined by the orchestrator on each additional agent communication loop.

7. The computing system of claim 1, wherein each of the plurality of agents is configured to:

communicate with an agent resource to obtain the information relevant to the natural language input in the message, the agent resource is the trained generative language model, another trained generative language model, a database server, or an application server.

8. A computing system for managing specialized tasks and information retrieval processes, the computing system comprising:

processing circuitry configured to:

execute a plurality of agents, each agent configured to perform tasks and/or retrieve information in a specialized domain based on natural language input;

cause an interaction interface for a trained generative model to be instantiated;

receive, via the interaction interface, a message from a user for the trained generative model;

extract a context of the message;

generate a request including the context and the message;

execute an orchestrator configured to:

receive the request;

make a semantic-based routing decision by:

providing a routing prompt including a natural language description of each of the plurality of agents, the message, and a natural language instruction to select a subset of the plurality of agents, and inputting the routing prompt into the trained generative model to identify the subset of the plurality of agents for routing the request, the trained generative model trained, prior to deployment, to perform semantic routing decisions based on natural-language agent definitions, routing prompts, and routing outcomes;

input the request into each of the subset of the plurality of agents to perform a task and/or retrieve information in specialized domains of the subset of the plurality of agents;

generate a promptbased on the retrieved information and/or the performed task and the message from the user;

provide the prompt to the trained generative model;

receive, in response to the prompt, a response from the trained generative model; and output the response to the user.

9. The computing system of claim 8, wherein the trained generative model is a trained generative language model having a generative pre-trained transformer architecture.

10. The computing system of claim 8, wherein the orchestrator is further configured to operate as a federator by:

collecting generated responses from the plurality of agents; and merging the collected generated responses, so that the prompt is generated based on the merged responses.

11. The computing system of claim 8, wherein the plurality of agents operate in either an autonomous mode or a consensus-driven mode.

12. The computing system of claim 8, wherein the plurality of agents are configured to interact with application programming interfaces (APIs) of services to perform actions, and the request is converted into commands which are processed by the APIs of the services.

13. The computing system of claim 8, wherein the plurality of agents are configured to interact with application programming interfaces (APIs) of services to run queries on relational databases.

14. The computing system of claim 8, wherein the retrieved information includes a confirmation of the performed task.

15. A computing method for managing specialized tasks and information retrieval processes, the computing method comprising:

executing a plurality of agents, each agent configured to perform tasks and/or retrieve information in a specialized domain based on natural language input;

causing an interaction interface for a trained generative model to be presented;

receiving, via the interaction interface, a message from a user for the trained generative model;

extracting a context of the message;

generating a request including the context and the message;

executing an orchestrator configured to:

receive the request;

make a semantic-based routing decision by:

providing a routing prompt including a natural language description of each of the plurality of agents, the message, and a natural language instruction to select a subset of the plurality of agents, and inputting the routing prompt into the trained generative model to identify the subset of the plurality of agents for routing the request, the trained generative model trained, prior to deployment, to perform semantic routing decisions based on natural-language agent definitions, routing prompts, and routing outcomes;

input the request into each of the subset of the plurality of agents to perform a task and/or retrieve information in specialized domains of the subset of the plurality of agents;

generating a prompt based on the retrieved information and/or the performed task and the message from the user;

providing the prompt to the trained generative model;

receiving, in response to the prompt, a response from the trained generative model; and outputting the response to the user.

16. The computing method of claim 15, wherein the trained generative model is a trained generative language model having a generative pre-trained transformer architecture.

17. The computing method of claim 15, wherein the orchestrator is further configured to operate as a federator by:

collecting generated responses from the plurality of agents; and merging the collected generated responses, so that the prompt is generated based on the merged responses.

18. The computing method of claim 15, wherein the plurality of agents operate in either an autonomous mode or a consensus-driven mode.

19. The computing method of claim 15, wherein the plurality of agents are configured to interact with application programming interfaces (APIs) of services to perform actions, and the request is converted into commands which are processed by the APIs of the services.

20. The computing method of claim 15, wherein the plurality of agents are configured to interact with application programming interfaces (APIs) of services to run queries on relational databases.

* * * * *